O. O. JUDD.
MACHINE FOR FORMING BUSHING PLUGS FOR ROLLS OF PAPER.
APPLICATION FILED JULY 29, 1907.
908,467.
Patented Jan. 5, 1909.
3 SHEETS—SHEET 1.
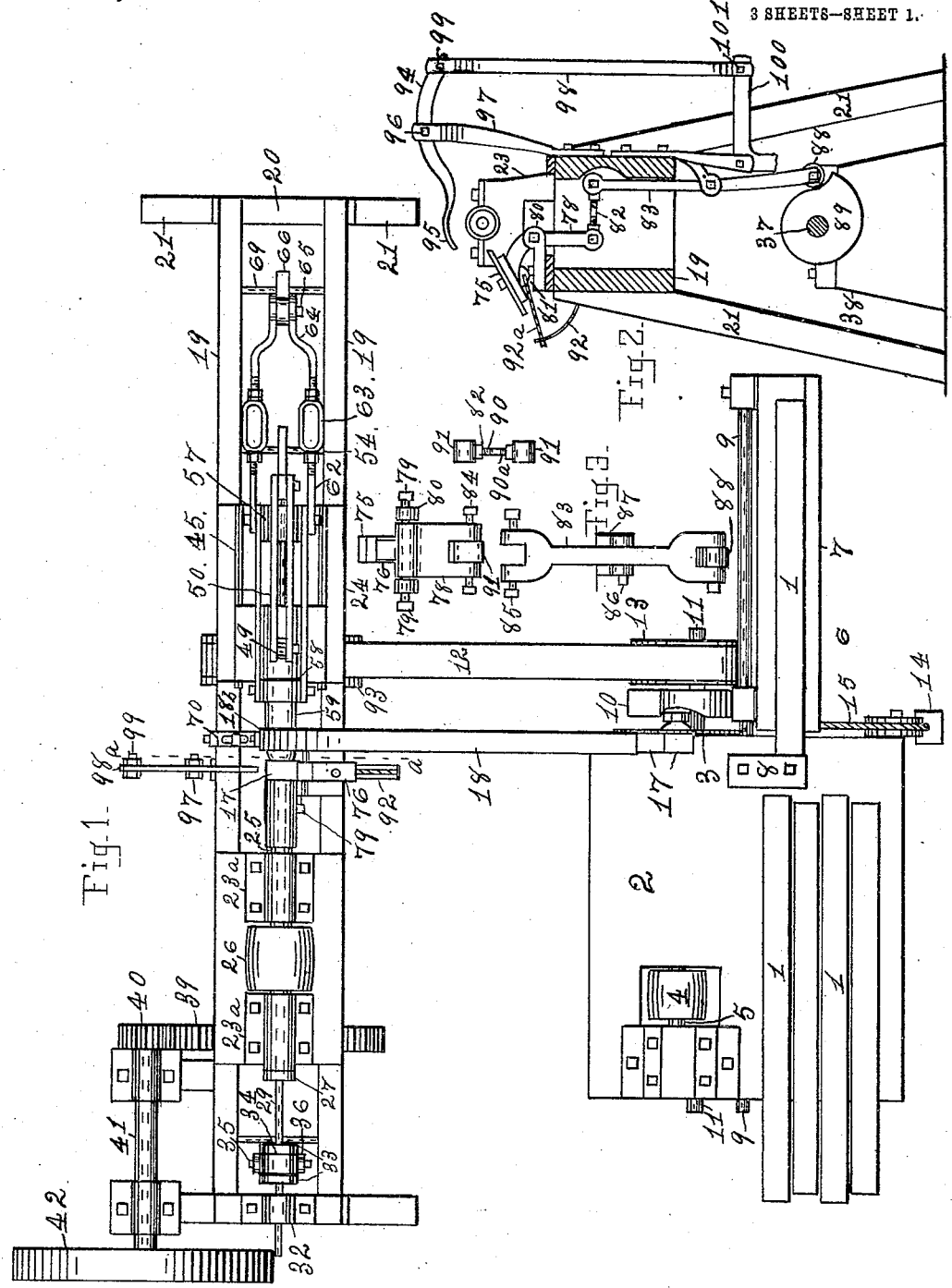
WITNESSES:
S. Appley.
C. M. Albee.
INVENTOR
Oscar O. Judd.
BY
G. H. Albee.
ATTORNEY O. O. JUDD.
MACHINE FOR FORMING BUSHING PLUGS FOR ROLLS OF PAPER.
APPLICATION FILED JULY 29, 1907.
908,467.
Patented Jan. 5, 1909.
3 SHEETS—SHEET 2.
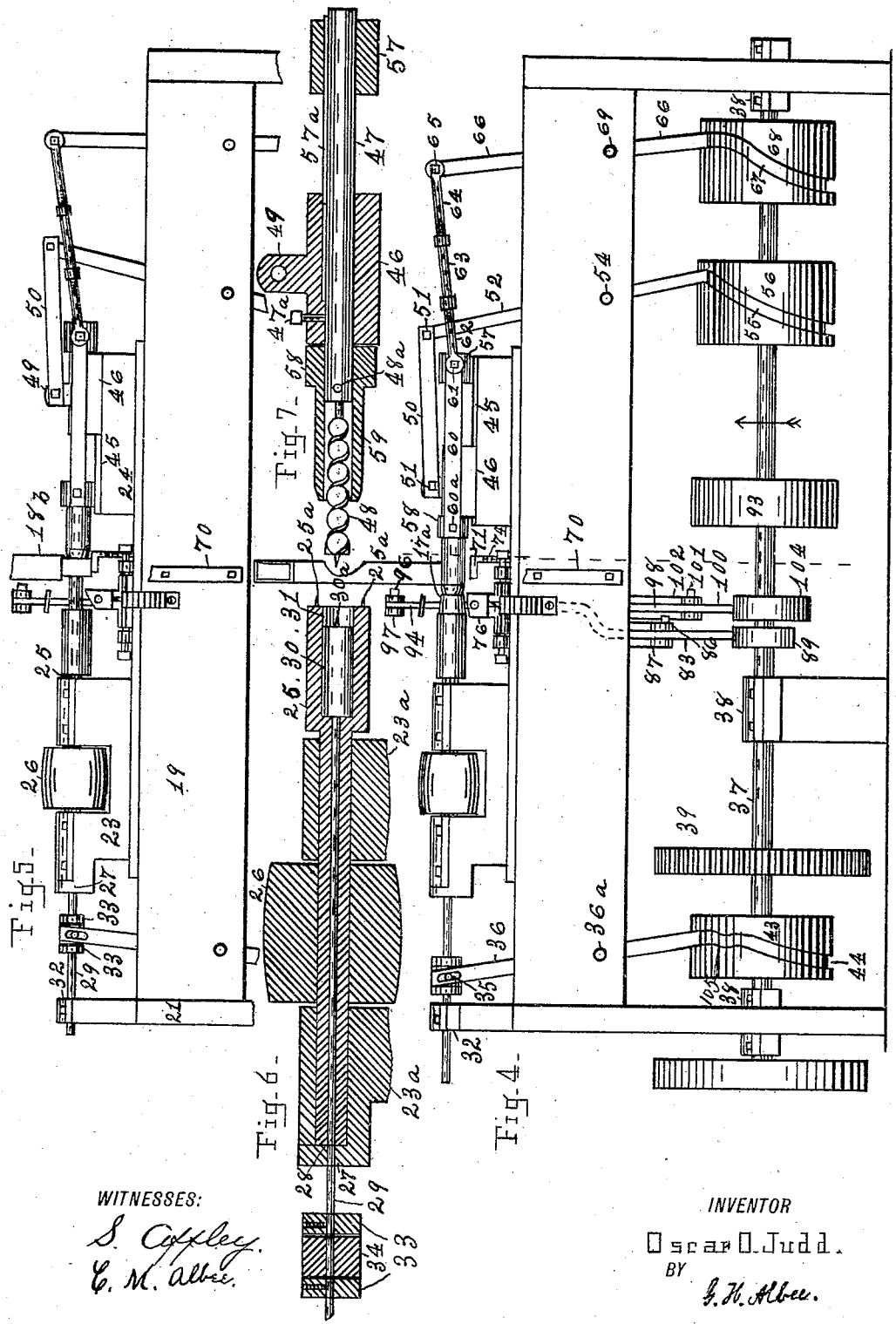
WITNESSES:
S. Coxley.
C. M. Albee.
INVENTOR
Oscar O. Judd.
BY
G. H. Albee.
ATTORNEY

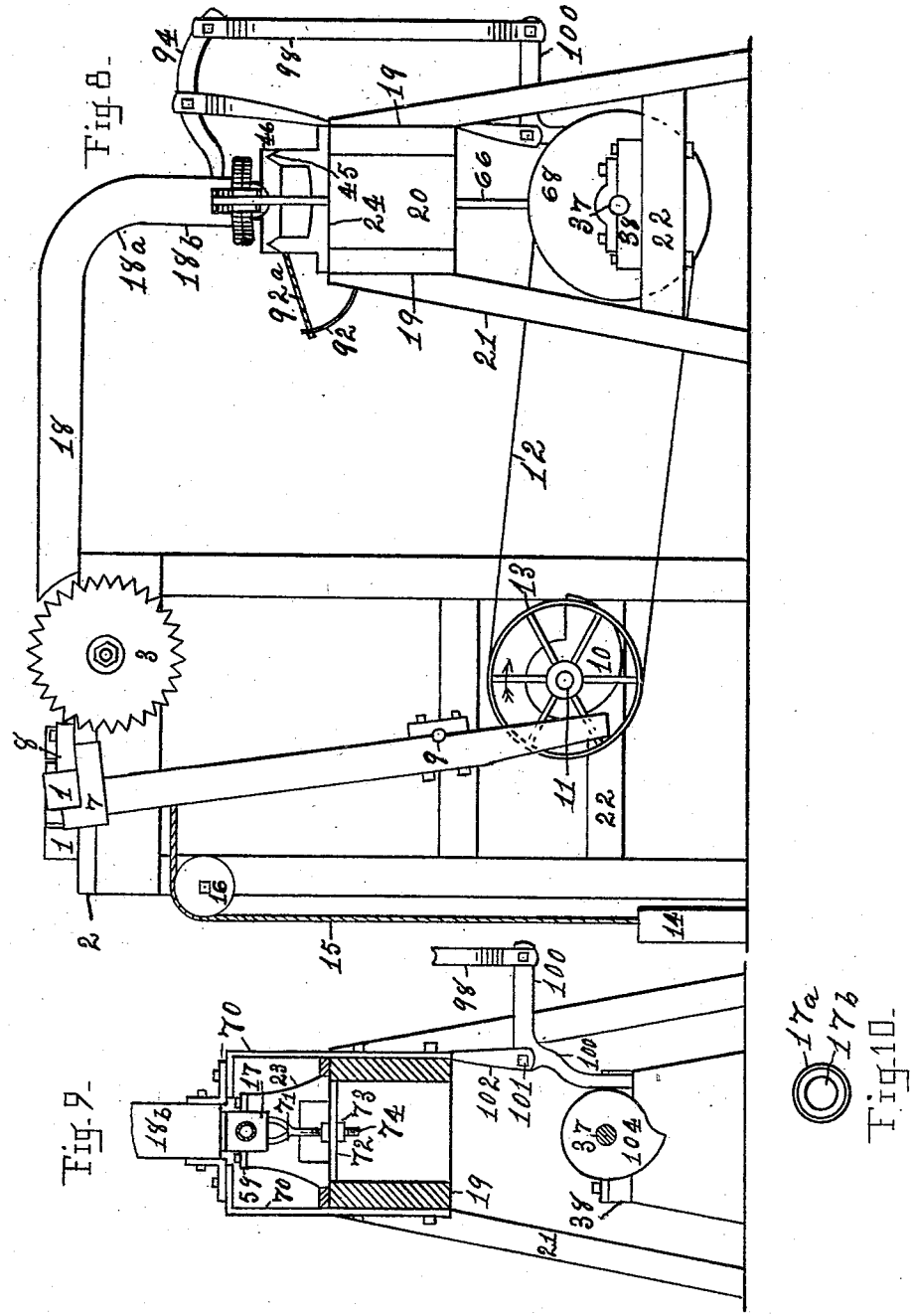

UNITED STATES PATENT OFFICE.

OSCAR O. JUDD, OF MENASHA, WISCONSIN.

MACHINE FOR FORMING BUSHING-PLUGS FOR ROLLS OF PAPER.

No. 908,467.      Specification of Letters Patent.      Patented Jan. 5, 1909.

Application filed July 29, 1907. Serial No. 386,077.

*To all whom it may concern:*

Be it known that I, OSCAR O. JUDD, a citizen of the United States, residing at Menasha, in the county of Winnebago and State of Wisconsin, have invented a new and useful Improvement in Machines for Forming Bushing-Plugs for Rolls of Paper, of which the following is a specification.

My invention relates to improvements in machines for forming bushing plugs for rolls of paper, in which a cutting off saw operates in conjunction with a conveyer and a boring and turning lathe; and the objects of my improvement are, first, to combine all of the mechanism for cutting off the blocks from which the bushing plugs are formed, conveying them to the boring and turning lathe, boring the blocks and turning them to a tapering form, and delivering them in a finished condition to a suitable receptacle; second, to combine all of the mechanism for performing the foregoing operations in one automatically operated machine; and third, to lessen the cost of manufacture of said plugs by combining into one automatically operated machine, requiring but a single attendant, all of the mechanism for the cutting off of the block, delivering them to the lathe, boring them, turning and delivering the same in a finished condition into a suitable receptacle. I attain these objects by the mechanism illustrated in the accompanying drawing, in which,—

Figure 1 is a plan view of the mechanism, the turning knife being removed from its stock and the finished plug removing device being broken off for showing a cubical block from which the plugs are formed in position for being turned, the cams for operating the several parts, the shaft, its journal boxes, &c., which are under the lathe frame, being omitted. Fig. 2 is a transverse vertical section of the turning lathe upon the line $a, a$, of Fig. 1, as it appears in looking toward the left, the cubical block above mentioned being removed. Fig. 3 shows details of the turning knife stock and the links and lever by which the knife is moved up to the work, in three separate parts. Fig. 4 is a side elevation of the boring and turning lathe, the knife stock and finished plug removing device being partly broken away, and a turned plug held between the lathe centers. Fig. 5 is a side elevation of the upper part of the boring and turning lathe, and showing a cubical block as it is being received between the lathe centers from the block conveyer the upper part of the conveyer being broken away. Fig. 6 is a vertical section of the upper part of the head block of the lathe, longitudinally thereof. Fig. 7 is a vertical section of the upper part of the tail block of the lathe, longitudinally thereof. Fig. 8 is an end elevation of the sawing machine frame and boring and turning lathe. Fig. 9 is a vertical section of the lathe upon the line $b, b$, of Fig. 4, the upper vertical part of the conveyer being broken away. Fig. 10 is an elevation showing the smallest end of the turned plug, having the central bore. Figs. 6, 7 and 10, are upon a larger scale than the others.

Similar numerals and letters indicate like parts in the several views.

The material from which the plugs are formed, is of any suitable wood, and is delivered to the cutting off saw in square sticks 1, of a sufficient transverse dimension, for the formation of bushing plugs of the required diameter, and for convenience, the sticks are arranged in a pile upon the fixed saw table 2, as in Fig. 1, at the left of the saw 3, the saw being driven by the pulley 4, upon its arbor 5, from any available source of power. The operator stands at 6, in front of the oscillatory saw table 7, and has only to slide the stick 1, along said table and up to the gage 8, as the table is at the rearward extremity of its oscillation. This table is oscillated upon the rod 9, in a forward direction, by means of the cam wheel 10, upon the shaft 11, the cam as it revolves engaging the upright of the table 7, said shaft being driven by the belt 12, running from a pulley on the lathe shaft to the pulley 13, upon the cam shaft. The return movement of the oscillating table is produced by means of the weight 14, and rope 15, the rope running over the pulley 16 on the fixed saw table. As the cubical blocks 17, are cut from the stick 1, they are pushed, one after another, toward, and into, the conveyer, 18, and when they arrive at the curve $18^a$, of the conveyer, fall into the vertical part, $18^b$, for delivery to the lathe centers. The oscillating saw table operated by a cam or other mechanism, may be dispensed with in some cases, and the table be operated by the workman.

The lathe frame consists of side pieces 19, ends 20, legs 21, and girths 22; the head block 23 and tail block 24 being mounted upon the side pieces 19. In the head block bearings 23$^a$, is journaled the live spindle 25, which is driven with a belt upon the pulley 26, fixed to spindle, from an overhead pulley, (not shown), the left hand bearing having an end shoulder, 27, which serves as a thrust bearing for the spindle. The live spindle has a bore 28, its entire length, its inside, or right hand end being counterbored to a larger diameter, and the outside of the spindle considerably enlarged. A rod 29, is arranged to slide along the small bore, while a centering plug 30 of a larger diameter than the hole to be bored in the article to be turned, is fixed to the right hand end of the rod 29, and can slide in and partly out of the counterbore 31 and is free to revolve within the spindle. The rod 29 is extended toward the left and passes through both the thrust bearing and end support 32, and is provided between the support 32 and left hand journal box 23$^a$, with two collars, 33, which are fixed to the rod, and with a collar 34 loose thereon between them, the latter being engaged by means of pins 35 with the cam lever 36, said cam lever being fulcrumed upon the rod 36$^a$, which is arranged through the lathe side pieces. The end of the plug 30 may be provided with a center spur 30$^a$, and the end of the live spindle should have spurs 25$^a$, for engaging with the block to be turned.

A main line shaft 37 is arranged for revolution in journal boxes 38, upon girths 22 of the lathe frame, said shaft being provided with a gear wheel 39, which is engaged with a pinion 40, upon the shaft 41, the outer end of said shaft being provided with a pulley 42, by which it may be driven by the overhead arranged shaft which drives the live spindle of the lathe. Secured upon the shaft 37, is a cam wheel 43, provided with a diagonally arranged circumferential groove 44, with which the lower end of the cam lever engages and slides the rod 29 and plug 30, longitudinally.

The cam wheel 43 has its groove 44, so arranged around it, that at each revolution of the wheel, the rod 29 and plug 30, will slide to the right for centering the block to be turned, as is shown in Fig. 5, and then slide immediately to the left, as is shown in Fig. 6, for allowing the auger bit to pass entirely through the block without interfering with the sliding plug, and so remaining at the left until after the block has been bored, turned and is ready to be removed from between the lathe centers.

Mounted to slide upon ways 45 of the tail block 24, is an auger bit shaft holder, 46, having a bit shaft 47 secured therein with the set screw 47$^a$, or otherwise, an auger bit 48, being secured to said shaft by means of the pin 48$^a$. Extending upward from the holder 46 is an arm 49, from which two straps 50, which are secured to the arm with bolt 51, extend rearwardly to, and are connected with the upper end of the lever 52, by means of a bolt 51, the lever being fulcrumed upon the rod 54, and having its lower end engaged with the groove 55, of the cam wheel 56. Near the rear, or right hand end of the shaft 47, a collar 57 is slidingly mounted, and is held from turning around thereon by the spline 57$^a$, and near its forward end a collar 58, having a tubular sleeve 59 integral with it, is mounted to slide easily. This sleeve at its free end 58 serves as the tail center of the lathe, the end of the plug 30, being the live center, and on which two centers the block to be turned is first received from the conveyer, as it drops from the sleeve 59, as will be further explained. The collars 57 and 58 the latter being a continuation of 59 are connected together by means of straps 60, which are secured to the collars with bolts 60$^a$, and 61. From the bolts 61, screw rods 62, turn buckles 63, and screw rods 64, extend to the right of the tail block, the outer ends of the rods 64 being connected by the bolt 65 with the upper end of the lever 66, whose lower end is engaged with the groove 67 of the cam wheel 68, the lever being fulcrumed upon the rod 69.

The rods 62 and 64 are provided with right and left threads for engaging with the turn buckles, for the purpose of regulating to a fraction, the forward movement of the tail center, or sleeve 59, and thereby producing the proper degree of pressure upon the block to be turned, for holding it tightly against the end of the live spindle, as in Figs. 1 and 4.

The conveyer is supported a little above the sleeve 59, upon brackets 70, (see Fig. 9), part of the brackets on the front of the lathe in Figs. 4 and 5 being omitted. The blocks 17, as they fall to the lower open end of the conveyer, are held up by the sleeve 59 until the turning of the cam wheel 56, causes the sleeve to move to the right from under the conveyer, when said block will fall upon the supporting fingers 71, said fingers being mounted in the cross bar 72, and made vertically adjustable by means of nuts 73 on the threaded stem 74 of the fingers. By raising and lowering said fingers, the block can be vertically centered with accuracy, and they can be centered transversely of the lathe by adjusting the conveyer upon the supporting brackets. The tool for turning the plugs comprises a knife 75, which is bolted to the tool stock 76, with bolt 77, the tool stock consisting of the part to which the knife is bolted and a depending arm 78, which parts are pivoted intermediate their ends with bolts 79 to the bed piece 80, said bed piece being bolted with bolt 81 to the bed piece of the head and tail blocks of the lathe. From the lower end of the arm 78, a link 82 extends nearly horizontally to the vertical lever 83, the lever being pivoted with bolt 84 at one end to the arm 78, and at the other end with the bolt 85, to the lever 83, and said lever being fulcrumed intermediate its ends upon the bolt 86 in the bracket arm 87, the lower end of said lever being provided with a roller 88 for engaging with the cam wheel 89, the revolutions of the cam wheel causing the knife to be advanced to the block to be turned. In Fig. 2 the knife and its mechanism and its operating cam are shown as having just completed the turning of the plug. Fig. 4 shows in dotted lines the necessary curves in the lever 83 for reaching the cam wheel 89. The link 82 is provided with right and left hand threads 90 and 90ª, which engage the pivoted nuts 91, at each end of it, for the purpose of adjusting the degree of forward throw of the tool stock and thereby governing the diameter of the turned plug. The knife is quickly drawn away from the plug after it is turned, by means of a spring 92, it being connected to the tool stock in such a manner, as by a cord 92ª, as to draw the knife away from the plug, as is shown in Figs. 1, 2 and 8. The pulley 93 upon the shaft 37, is for the purpose of transmitting power by means of the belt 12 to the cam shaft 11.

It should be observed that the pulley 93 is of greater diameter than the pulley 13 on the cam shaft 11, which difference in their diameter is for the purpose of supplying a few more blocks for the conveyer in a given time, than the lathe is arranged to turn, so as to allow for time lost by the operator in providing his supply of sticks upon the saw table to be cut into blocks to be turned.

The different parts are operated in the following order:—The operator supplying the saw with sticks 1, and feeding them up to the gage as described, the blocks are fed into the conveyer, and will fall into the vertical part of it, the lower block being arrested by and upon the sleeve 59, (while a block is being turned,) and as the sleeve recedes to the right after said block is turned, will fall upon the fingers 71. The plug 30, then advancing to the block, and the sleeve 59 advancing at the same instant, the block will be held between the plug and sleeve, the sleeve continuing to advance while the plug recedes, the block will be clamped between the sleeve and end of the live spindle in which the spurs 25ª, are fixed. As the plug recedes, the auger bit is advanced through the sleeve and the block is bored. The knife stock is then acted upon by its operating cam and the block is turned, the auger bit at the same time receding while the sleeve commences its backward movement, whereby the turned plug 17ª, having the bore 17ᵇ, is permitted to fall from its position on the spurs of the live spindle; but to make its removal positive and provide a clear field for the next block, a plug remover is applied to the rear side of the lathe, consisting of the curved lever 94, having a finger 95, for throwing the turned plug downward from between the lathe centers, said lever being pivoted on the bolt 96 in the bracket arm 97 and a vertically arranged rod 98 which is pivoted on the bolt 99, to the outer end of the lever extends downward therefrom to the outer end of the angle lever 100, and said angle lever is pivoted on the bolt 101 in the bracket arm 102, which arm depends from the lathe frame. The vertical arm of the angle lever 100 is engaged by the cam wheel 104 upon the shaft 37. The action of the cam wheel 104, as its cam engages the angle lever end 100, is to throw the finger 95, downward and remove the turned plug from between the lathe centers the instant its turning is completed.

The grooves in the cam wheels 43, 56 and 68 and the forms of cams 89 and 104, are to be such and be so arranged in position upon the shaft 37, as to produce the necessary movements in their required order.

In order to assist the removal of the article being turned from the spurs of the live spindle, at the instant that the article is finished, the plug 30, which during the boring and turning is withdrawn into the live spindle, is caused to slide quickly to the right, just sufficient to push the article being turned, from off of the spurs 25ª, so that the turned article is free to fall. This I do by forming a short curve, 105, in the groove 44 of the cam wheel 43, which curve causes the lever 36, to act upon the rod 29 and throw the plug 30, or end of the rod if the rod takes the place of the plug, just out of the end of the live spindle, and push the article turned from off of the spurs.

The automatically operating saw table with the conveyer for supplying blocks to a lathe are not claimed broadly to be new, but in combination with the increased movements of the table to and from the saw over the revolutions of the lathe cam shaft which revolves once for each block turned, they are believed to be so.

Having described my invention, what I claim and desire to secure by Letters Patent, is,—

In an automatically operating mechanism for boring and turning articles of wood from a cubical block, the combination of the following instrumentalities acting in the order named, a lathe, a main driving shaft therefor, a plurality of cams thereon, grooves having curves in their courses around some of said cams for operating various mechanism of the lathe, as herein recited, in order as to time relative to each other, means for revolving said shaft, a tubular live spindle mounted in the lathe head blocks and means for revolving the spindle independently of said main driving shaft, a plurality of spurs upon the inner end of said spindle, a loosely revoluble centering plug reciprocated independently of the movements of the tubular live spindle, the tail centering sleeve and the auger bit, and having a movement toward and from the block to be turned twice during the turning of each block, a spur centrally of its inner end, a non-rotating tubular tail centering sleeve in axial line with said live spindle arranged for movement toward and from said spindle, a conveyer into which blocks can be fed mounted above the path of reciprocation of the inner end of said tail centering sleeve, said tail centering sleeve moving backward from under the block in the lower end of said conveyer, a suitable support under said conveyer for receiving a block to be turned as it drops from said tail centering sleeve after said backward movement, said centering plug having a forward movement for centering a block between it and said tail centering sleeve and removing the block from said support, said centering plug and tail centering sleeve having a forward movement with a block between them toward the live spindle until the block is engaged by the spurs thereof, the forward movement of said centering plug continuing until it is within the bore of said spindle and is clear of said block, a non-rotating auger bit arranged for reciprocation within said tail centering sleeve, and having a movement toward and through the block independently of the movement of the tail centering sleeve, a knife arranged to be advanced transversely of the spindle up to the block for turning the same, and to return the auger bit, and after it, the tail centering sleeve, moving to withdraw them from the turned block, said centering plug then advancing toward the turned block for releasing said block from engagement with the spurs of the live spindle, and a lever arranged to throw the finished block downward at the instant of its release from said spurs.

OSCAR O. JUDD.

Witnesses:
C. A. ROBINSON,
LOUIS ELLINGER.